United States Patent
Norman

[11] 3,860,169
[45] Jan. 14, 1975

[54] AMBIENT TEMPERATURE CONTROL SYSTEM

[75] Inventor: Robert J. Norman, Chicago, Ill.

[73] Assignee: Powers Regulators Company, Skokie, Ill.

[22] Filed: Nov. 7, 1973

[21] Appl. No.: 413,540

[52] U.S. Cl. .................... 236/68 C, 60/527, 251/11
[51] Int. Cl. ............................................ G05d 23/02
[58] Field of Search ........... 236/68 R, 68 C; 60/516, 60/527, 528; 251/11

[56] References Cited
UNITED STATES PATENTS
3,500,634  3/1970  Waseleski et al. ................ 236/68 C
3,696,611  10/1972  Hoakes et al. ......................... 60/527

Primary Examiner—Edward G. Favors

[57] ABSTRACT

A system for controlling ambient temperature having a valve that adjusts the amount of fluid flow is disclosed. The valve includes a chamber containing thermal-expansive material and a piston which moves outwardly from the chamber to retard fluid flow when the thermal-expansive material is heated. The valve further includes a heater for heating the thermal-expansive material and a thermistor disposed in close thermal-relationship with the heater. Because of this close thermal-relationship, the resistance of the thermistor quickly changes in response to temperature changes in the heater. Since the thermistor is part of an electrical circuit for energizing or de-energizing the heater, ambient temperature is controlled. The system also includes a safety switch for de-energizing the heater in the event an open-circuit appears across the thermistor and is further adapted to control ambient temperature whether the fluid flow consists of hot or cold water.

21 Claims, 3 Drawing Figures

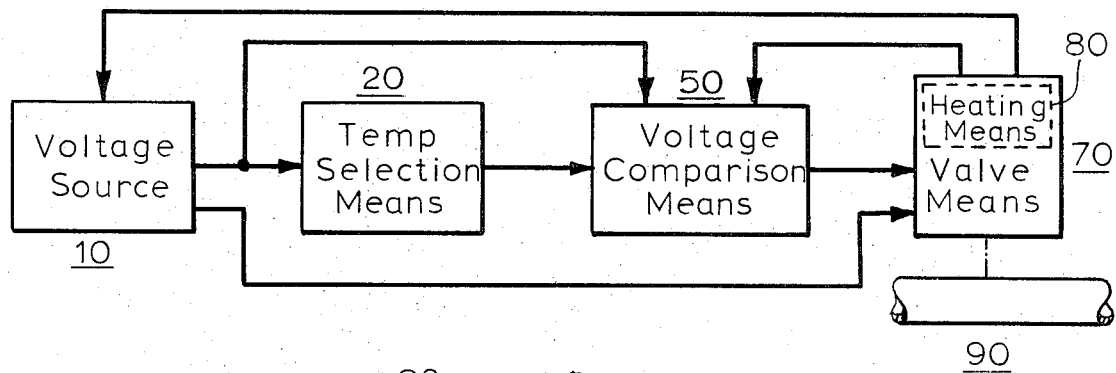
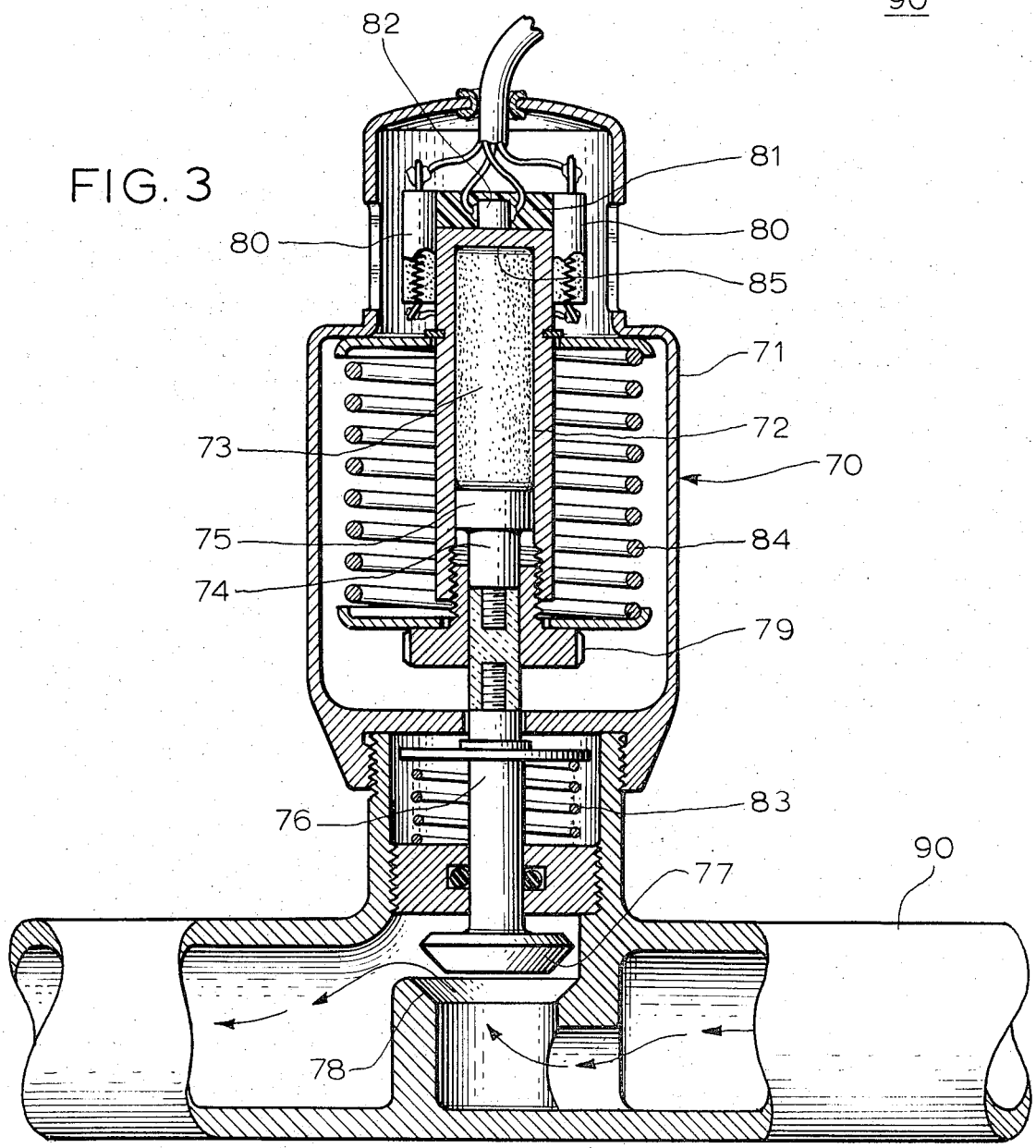

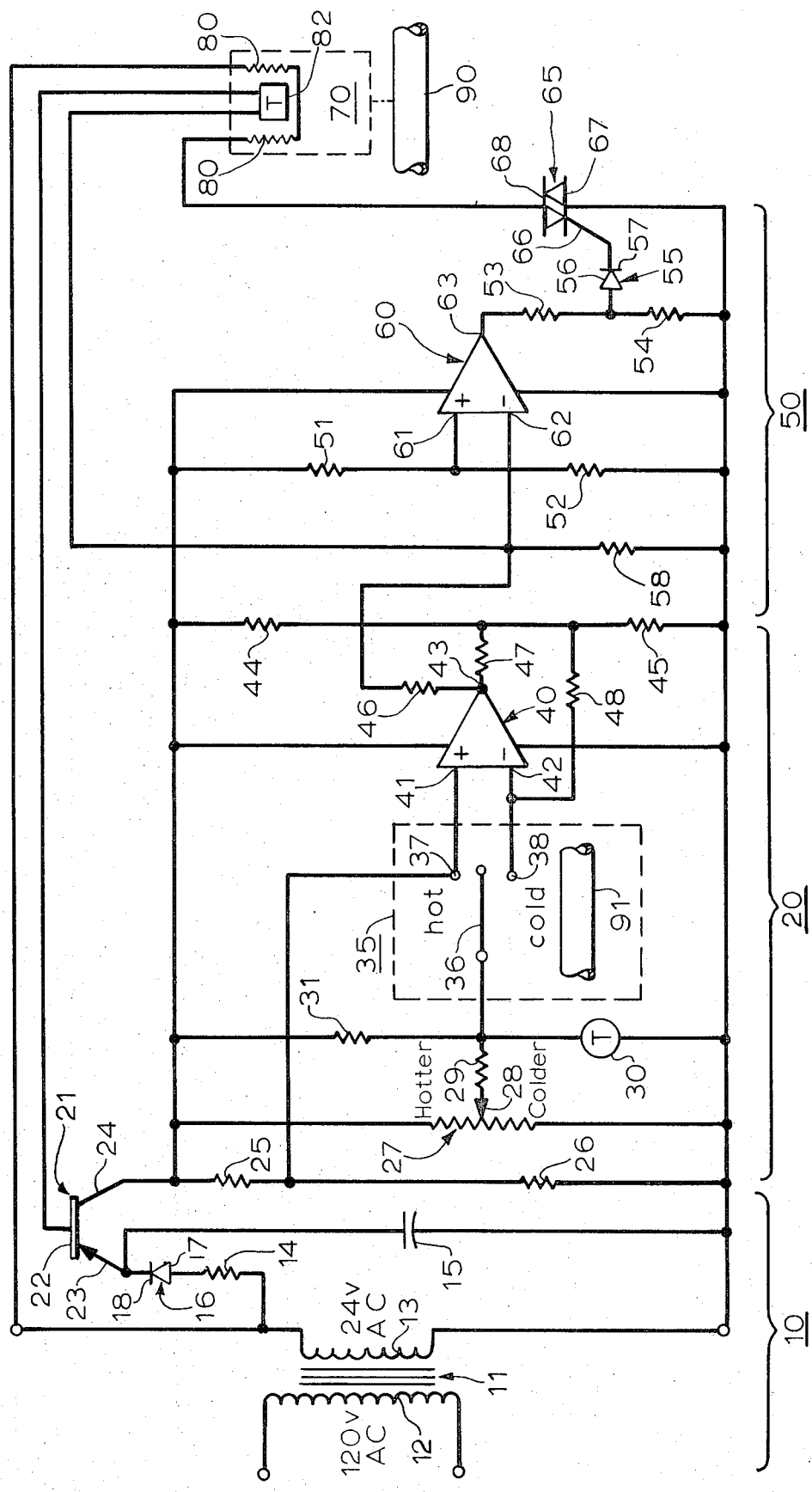

AMBIENT TEMPERATURE CONTROL SYSTEM

BACKGROUND OF THE INVENTION

This invention relates to a system for controlling ambient temperatures, and in particular, to a system for controlling a valve that adjusts the amount of fluid flowing through a pipe, conduit or similar fluid passage means. In brief, the valve is of the type having a chamber containing thermal-expansive material and a piston slidably secured within the chamber. A heater is fastened in thermal relationship with the thermal-expansive material and, when energized, causes the material to expand. Upon expansion, the material forces the piston to move outwardly from the chamber and into cooperation with the fluid passage means to retard fluid flow therein. When the heater is de-energized, the thermal-expansive material cools, and the piston retracts, thus permitting fluid within the fluid passage means to flow more freely. Since ambient temperature is determined by the rate of fluid flow, the valve and the system for adjusting the valve can be used to effect and maintain a desired temperature.

Such a control system generally incorporates a temperature-sensitive circuit device, such as a thermistor, to control the energization of the heater. The heater, in turn, controls the movement of the piston and hence the rate of fluid flow. One prior art system, for example, utilizes a temperature-sensitive device which is embedded in the thermal-expansive material contained within the valve chamber. This device is coupled to a control circuit for intermittently energizing the heater, and hence, adjusting the rate of fluid flow through the fluid passage means.

Though this prior art system successfully controls and maintains ambient temperatures at a selected setting, it is subject to undesirable fluctuations about the temperature so selected. These fluctuations are due to an inherent delay between the time it takes the heater to reach the temperature corresponding to proper piston position, and the time it takes to heat the temperature-expansive material to that temperature. Because of this delay, the heater remains energized longer than necessary, thereby overheating the thermal-expansive material and pushing the piston beyond the proper position. Since the piston responds to the temperature of the thermal-expansive material instead of the temperature of the heater, it tends to overshoot the position for fluid flow corresponding to the selected ambient temperature, and then "hunt" back and forth about the optimum position.

Prior art control systems utilizing thermistors are also subject to heater runaway in the event of thermistor failure. For example, if a thermistor lead breaks, thereby open-circuiting the thermistor, a maximum amount of current will flow in the circuit energizing the heater. In normal operation the thermistor resistance, which varies inversely with heater temperature, would then decrease, thereby drawing current away from the heater energizing circuit. Because of the open-circuit condition of the thermistor, however, current will not be drawn away from the heater, and therefore, the heater will erroneously remain in an energized condition indefinitely. As a result, the thermal-expansive material within the valve chamber will be continuously heated, causing the piston to be moved to a position of fluid flow which does not correspond to the ambient temperature selected.

The ambient temperature control system of the invention overcomes these and other drawbacks in the prior art by providing a valve having a temperature-sensitive circuit device—a thermistor—in close thermal relationship with the heater used for heating the thermal-expansive material contained in the valve chamber. Because of this thermal relationship, the thermistor will cause the heater to be de-energized slightly before the piston reaches the position for fluid flow corresponding to the selected ambient temperature. The residual heat from the heater will then be sufficient to move the piston to its proper position, thereby minimizing the overshoot attendant prior art devices. In short, the system of the invention anticipates proper piston position because it is not subject to the inherent delay involved in first heating the thermal-expansive material.

The system of the invention further includes an ambient temperature control for producing a voltage corresponding to a selected temperature, and a conventional operational amplifier, producing an output signal for energizing the heater. The operational amplifier includes a first input terminal for receiving a control signal dependent upon the voltage from the temperature control, and a second input terminal for receiving a comparison signal impressed across a resistor. The thermistor associated with the heater, having a resistance which varies inversely with temperature, is used to vary the voltage from the temperature control to produce the control signal applied to the first input terminal of the amplifier. Thus, when the temperature of the heater increases, for example, the thermistor resistance decreases, thereby drawing current through the thermistor and increasing the control signal above the absolute value of the comparison signal. The operational amplifier responds to this increase in the control signal by producing an inverted output signal which de-energizes the heater, thereby causing a compensating decrease in heater temperature. This temperature decrease promptly raises the resistance of the thermistor, causing less current to flow therethrough. As a result, the control signal decreases, the output signal re-energizes the heater and the position of the piston is quickly stablized. Since the thermistor responds closely to heater temperature, piston over-shoot is minimized.

The circuit of the invention further provides safety switch means for preventing heater runaway in the event there is a failure in the thermistor. More particularly, a normally conducting transistor is coupled between a source of D.C. voltage and the operational amplifier to permit the energization of the heater. The base terminal of the transistor is coupled to the thermistor, and acts as a gating device for de-energizing the heater when no current passes through the thermistor. Thus, if the current through the thermistor drops to zero, due to a broken lead, for example, the transistor becomes non-conductive, thereby de-energizing the heater and preventing heater runaway.

The control system of the invention is further adapted to reach and maintain a selected ambient temperature whether hot water or cold water is running through the fluid passage means. In particular, the system is provided with a by-pass conduit for diverting a small portion of the water in the fluid passage means into thermal relationship with a temperature-responsive switch. The switch detects the presence of hot or cold water in the conduit and automatically inverts the voltage from the temperature control if cold water is detected. If hot water is detected, the uninverted voltage is passed in the manner described above.

This difference in the polarity of the voltage from the temperature control for hot and cold water flow means that the heater, if energized under hot water conditions, will be de-energized under cold water conditions, and vice versa. Thus, for example, if a reduction in ambient temperature is desired, and hot water is flowing through the conduit, the uninverted voltage will cause the energization of the heater and move the piston into the fluid passage means, thereby decreasing the flow of hot water therethrough. If cold water is flowing through the conduit, however, the inverted voltage will cause the heater to be de-energized and the piston to retract from the fluid passage means, thereby increasing the flow of cold water therethrough. It is clear, however, that both a decrease in hot water flow, or an increase in cold water flow will produce the desired reduction in ambient temperature. Moreover, if an increase in ambient temperature is desired, the heater will be de-energized under hot water conditions, and energized under cold water conditions.

OBJECTS OF THE INVENTION AND BRIEF DESCRIPTION OF THE DRAWINGS

It is a primary object of this invention to provide an improved system for controlling ambient temperatures.

It is another primary object of this invention to provide an improved valve for use in a system for controlling ambient temperature.

It is another object of this invention to provide a valve, having a heater in close thermal relationship with a temperature-sensitive resistor, for use in a system for controlling ambient temperature.

It is still another object of this invention to provide a valve, for use in a system for controlling ambient temperature, which minimizes piston overshoot.

It is a further object of this invention to provide a valve, for use in a system for controlling ambient temperature which includes a safety switch for preventing heater runaway.

It is still a further object of this invention to provide, in a system for controlling ambient temperature having fluid passage means adapted for the passage of hot or cold water, a temperature responsive switch for automatically switching said system into a first mode corresponding to hot water flow, and a second mode corresponding to cold water flow.

Other objects, features and advantages of this invention will be apparent upon reading the following description of an exemplary embodiment of the invention in conjunction with the accompanying drawings in which:

FIG. 1 is a block diagram of the ambient temperature control system of the invention;

FIG. 2 is a circuit diagram of the ambient temperature control system shown in FIG. 1, including a block illustration of a valve incorporating the invention; and FIG. 3 is a cross-sectional view of the valve shown in FIG. 2.

DETAILED DESCRIPTION OF A PREFERRED EMBODIMENT OF THE INVENTION

The block diagram of FIG. 1 depicts a voltage source 10 which generates a D.C. voltage for energizing blocks 20 and 50, designated respectively as temperature selection means and voltage comparison means. Voltage source 10 also generates an A.C. voltage which is used to operate heating means 80 associated with valve means represented by block 70.

In a manner more fully described hereinafter, temperature selection means 20 develops a voltage corresponding to selected ambient temperature. A control signal, dependent upon the voltage from temperature selection means 20 and adjustable by a resistance (not shown), which varies inversely with the temperature of heating means 80, is applied to voltage comparison means 50. A comparison signal, produced by voltage source 10, is also applied to voltage comparison means 50. Voltage comparison means 50 produces an effectuation signal, corresponding to the difference between the control signal and the comparison signal, which is passed to heating means 80 associated with valve means 70. Valve means 70 respond to the temperature of heating means 80 and cooperate with fluid-passage means 90 for adjusting the rate of fluid flow therein. Fluid passage means 90, adapted to carry hot or cold water, are coupled to any conventional heat radiating system, whereby the rate of fluid flow within fluid passage means 90 controls ambient temperature.

Referring now to FIG. 2, a transformer 11, having a primary winding 12 and a secondary winding 13 is coupled to a conventional 120 volt A.C. voltage source at primary winding 12 to produce a 24 volt A.C. voltage across secondary winding 13. Connected to secondary winding 13 is a resistor 14, having a capacitor 15 parallely coupled thereto. A diode 16, having an anode 17 coupled to resistor 14 and a cathode 18 coupled to capacitor 15, half-wave rectifies the 24 volt A.C. voltage appearing across secondary winding 13. Resistor 14 and capacitor 15 provide filtering for producing a substantially D.C. voltage at cathode 18 of diode 16.

A PNP transistor 21, having a base 22, an emitter 23, and a collector 24, is connected to cathode 18 at emitter 23. Transistor 21 is normally conducting, thereby permitting D.C. voltage to be passed from emitter 23 to collector 24. If for any reason, however, current fails to flow through base 22, transistor 21 will become nonconductive, thereby blocking passage of D.C. voltage to collector 24. The D.C. voltage received at collector 24 is used to energize the ambient temperature control system shown in FIG. 1. As explained more fully hereinafter, transistor 21 functions as a safety switch for de-energizing the control system to prevent a condition referred to herein as heater runaway.

A variable resistor 27, having an adjustable tap 28, is coupled between collector 24 and a point of relatively low potential referred to hereinafter as ground. Tap 28 is coupled through a resistor 29 to a wiper 36 in a temperature responsive switch 35. Switch 35 includes a hot terminal 37 and a cold terminal 38, and incorporates conventional temperature-responsive bi-metal means (not shown) for moving wiper 36 into electrical contact with either terminal 37 or terminal 38. More particularly, switch 35 is disposed in terminal relationship with a fluid by-pass conduit 91, adapted to carry hot or cold water. When fluid by-pass conduit 91 carries hot water, the temperature responsive bi-metal means in switch 35 expand to bring wiper 36 into electrical contact with hot terminal 37, and when fluid by-pass conduit 91 carries cold water, the bi-metal means in switch 35 contract to bring wiper 36 into electrical contact with cold terminal 38. Temperature responsive switch 35 thus has two operating modes corresponding to a hot water condition and a cold water condition.

The ambient temperature control system shown in FIG. 2 further includes a resistor 31 coupled between collector 24 and wiper 36, and a thermistor 30 coupled between wiper 36 and ground. Associated with thermistor 30 is a resistance which varies inversely with ambient temperature. Thermistor 30 and variable resistor 27 cooperate to produce a voltage at wiper 36 for maintaining the ambient temperature at a selected value.

Since variable resistor 27 is coupled between collector 24 and ground, a D.C. voltage will be applied across variable resistor 27 as long as transistor 21 is conducting. Tap 28 can thus be adjusted to pick off a portion of the voltage across variable resistor 27 which corresponds to the selected ambient temperature. For example, if tap 28 is moved upwardly for selecting a hotter ambient temperature, an increasing amount of current will be drawn through tap 28 and thermistor 30. As a result, a greater voltage will appear across thermistor 30 and be applied to wiper 36. As explained in detail hereinafter, an increase in voltage applied to wiper 36 may cause a corresponding increase in ambient temperature whether switch 35 is in its hot or cold operating mode. As the ambient temperature increases, the resistance associated with thermistor 30 decreases causing a decrease in the voltage applied thereacross. As a result, the voltage applied to wiper 36 can be used for stabilizing the ambient temperature at the value selected.

In a similar manner, if tap 28 is moved downwardly for selecting a colder ambient temperature, less current will be drawn through thermistor 30 causing a smaller voltage to be applied to wiper 36.

A grounded operational amplifier 40, having a positive or correlating terminal 41, a negative or inverting terminal 42 and an output terminal 43, is energized by D.C. voltage from collector 24. Positive terminal 41 is coupled to hot terminal 37 of switch 35, and negative terminal 42 is coupled to cold terminal 38. A pair of serially connected resistors 25 and 26, coupled between collector 24 and ground, are adapted to provide biasing voltage to amplifier 40 through a lead connecting hot terminal 37 to a point above ground between resistor 25 and resistor 26. Another pair of serially connected resistors 44 and 45, also coupled between collector 24 and ground, are adapted to provide biasing voltage to negative terminal 42 through a lead coupling negative terminal 42 through a feedback resistor 48 to a point above ground between resistor 44 and resistor 45. A resistor 47 is connected between output terminal 43 and said point above ground between resistor 45 and resistor 46.

Amplifier 40 produces, in a conventional manner, an amplified output voltage at output terminal 43 corresponding to the difference in the absolute values of the voltages applied to terminals 41 and 42. For example, when the voltage at wiper 36 is passed through hot terminal 37 to positive terminal 41, the voltage at terminal 41 exceeds that of the bias voltage applied to terminal 42 from resistor 45, thereby producing a positive or correlating voltage at output terminal 43. On the other hand, if the voltage at wiper 36 is applied through cold terminal 38 to negative terminal 42, the voltage at terminal 42 exceeds that of the bias voltage applied to terminal 41 from resistor 26, thereby producing a negative or inverted voltage at output terminal 43.

Output terminal 43 is coupled through a resistor 46 to a grounded operational amplifier 60 energized by D.C. voltage from collector 24. Amplifier 60 includes a positive or correlating terminal 61, a negative or inverting terminal 62 and an output terminal 63. Terminal 62 is connected to resistor 46 for receiving the control signal appearing at output terminal 43 of amplifier 40. As explained hereinafter, the voltage at output terminal 43 is adjusted by the serial combination of a resistor 58 and a thermistor 82 to produce a control signal applicable to negative terminal 62 of amplifier 60.

A pair of serially connected biasing resistors 51 and 52, coupled between collector 24 and ground, are adapted to provide biasing voltage to amplifier 60 through a lead connecting terminal 61 to a point above ground between resistor 51 and resistor 52. Another pair of serially connected resistors 53 and 54 are coupled between output terminal 63 of amplifier 60 and ground. A diode 55 having an anode 56 and a cathode 57 is coupled to a point above ground between resistor 53 and resistor 54 at anode 55. Diode 55 is a unidirectional circuit element which passes positive-going signals from output terminal 63, but blocks negative-going signals therefrom. A bi-directional thyristor, or triac 65, has a gating terminal 66, coupled to cathode 57, a grounded terminal 67 and a main terminal 68. When a signal passing through diode 55 is applied to gating terminal 66, triac 65 becomes conductive, and because it is bi-directional, triac 65 passes A.C. voltage. Main terminal 68 of triac 65 is coupled through a pair of serially connected resistance heaters 80, associated with valve means 70, to the secondary winding 13 of transformer 11. Thus when triac 65 is conductive, A.C. current will flow through heaters 80 and triac 65 to ground. When A.C. current flows through heaters 80, they will increase in temperature in a conventional manner.

Thermistor 82, disposed in thermal relationship with heaters 80, has a resistance varying inversely with the temperature thereof. Thermistor 82 is electrically coupled between base 22 of transistor 21 and negative terminal 62 of amplifier 60. Negative terminal 62 is coupled through resistor 58 to ground. When the resistance associated with thermistor 82 increases due to a decrease in the temperature of heaters 80, the current through resistor 58 decreases, thereby decreasing the control signal applied to negative terminal 62. Similarly, when the resistance of thermistor 82 decreases, current increases through resistor 58, thereby increasing the control signal applied to negative terminal 62. Thus, the control signal applied to negative terminal 62 also depends on the resistance of thermistor 82, and hence, the temperature of heaters 80.

Operational amplifier 60 produces an amplified output voltage at output terminal 63, corresponding to the difference between the signals applied to positive terminal 61 and negative terminal 62. The signal at negative terminal 62 is, of course, the control signal from output terminal 43 of amplifier 40. Since amplifier 60, in effect, compares the control signal with the signal applied to positive terminal 61, this latter voltage is sometimes referred to herein as a comparison signal. Thus, when the absolute value of the comparison signal exceeds that of the control signal, a positive or correlating output voltage is produced at output terminal 63. When the absolute value of the control signal exceeds that of the comparison signal, a negative or inverted output signal is produced at output terminal 63. (It should be observed, however, that if the polarity of the signal having the largest absolute value and the polarity of its corresponding input terminal are both negative, the polarity of the output signal at output terminal 63 will be positive.) Since the output signal at terminal 63 causes the energization or de-energization, i.e., the effectuation of heaters 80, it is sometimes referred to herein as an effectuation.

It should be observed that the value of the control signal, and hence the polarity of the effectuation signal, is dependent upon the instantaneous resistance associated with thermistor 82. Since this resistance depends upon the temperature of heaters 80, there is some temperature at which thermistor 82 will change the control signal sufficiently to cause a change in the polarity of the effectuation signal, thereby energizing or de-energizing heaters 80, as the case may be. This temperature threshold level associated with thermistor 82 varies, of course, with the ambient temperature selected by tap 28.

Referring now to FIG. 3, valve means generally referred to by numeral 70 include a housing 71 having a chamber 72. Chamber 72 contains thermal-expansive material 73 such as a silicon rubber which expands and contracts upon heating and cooling, respectively. A piston 74 is movably disposed inside chamber 72 and is adapted to slide outwardly therefrom upon expansion of material 73. Sealing means 75 cooperate with piston 74 and the inside walls of chamber 72 for maintaining thermal-expansive material 73 therein. A calibration screw 79 is adapted to cooperate with chamber 72 for adjusting the volume of chamber 72, and hence the pressure applied to piston 74 by thermal-expansive material 73.

Cooperating with piston 74 is a thermally insulated connecting rod 76 having a poppet 77 disposed at the distal end thereof. Poppet 77 protrudes into fluid passage means 90 and cooperates with a seat 78 disposed therein for retarding the fluid flow in passage means 90. It should be apparent that piston 74, connecting rod 76, and poppet 77 all move in response to the expansion of thermal-expansive material 73. Accordingly, piston 74, connecting rod 76, and poppet 77 are sometimes referred to generically herein as a piston. As mentioned above, fluid passage means 90 is coupled to by-pass conduit 91 (FIG. 2), permitting a relatively small amount of fluid to be diverted therethrough. Thus, conduit 91 carries water having substantially the same temperature as fluid passage means 90, thereby causing temperature responsive switch 35 (FIG. 2) to switch to the proper mode.

The piston, associated with valve 70, moves outwardly from chamber 72 and against the force of a spring 83 when thermal-expansive material 73 expands. If poppet 77 is already seated in seat 78, and thermal-expansive material 73 continues to expand, pressure is exerted by thermal-expansive material 73 against the top 85 of chamber 72. This pressure is exerted against a spring 84, causing housing 71 to move upwardly, thereby preventing poppet 77 from becoming stuck in seat 78. As thermal-expansive material 73 contracts, spring 84 relaxes causing housing 71 to return to its original position, and as thermal-expansive material 73 contracts further, spring 83 pushes piston 74 back into chamber 72, thereby unseating poppet 77 from seat 78. As a result, fluid again flows through fluid passage means 90.

Heaters 80 are secured outside chamber 72, but in thermal relationship with the thermal-expansive material 73 contained therein. Accordingly, as the temperature of heaters 80 increases and decreases, the temperature of thermal-expansive material 73 increases and decreases correspondingly. Thermistor 82 is disposed in more direct thermal relationship with heaters 80 than thermal-expansive material 73. In particular, thermistor 82 is embedded in a metal oxide epoxy 81 between heaters 80. Metal oxide epoxy 81 is characterized by a relatively high thermal conductivity and a relatively low electrical conductivity, thereby permitting the temperature-sensitive resistance of thermistor 82 to respond quickly to temperature changes in heaters 80.

The operation of the ambient temperature control system of the invention can now be explained. Assume that an increase in ambient temperature is called for by moving tap 28 upwardly along variable resistor 27, and that conduit 91 is passing hot water, thereby causing wiper 36 to come into contact with hot terminal 37. As tap 28 moves up, more current flows through thermistor 30, thereby increasing the voltage at wiper 36 and hot terminal 37. As a result, amplifier 40 will produce a positive voltage at output terminal 43 which will be passed to negative terminal 62 of amplifier 60. The voltage at terminal 42 will then exceed the comparison signal applied to terminal 61, thereby causing a negative output signal to appear at output terminal 63. This negative output signal is blocked by diode 55 causing triac 65 to become non-conductive. As a result, A.C. current will not flow from secondary coil 13 of transformer 11, thereby de-energizing heaters 80.

Upon de-energization, heaters 80 decrease in temperature, thereby decreasing the temperature of thermal-expansive material 73. As thermal-expansive material 73 cools, piston 74, connecting rod 76, and poppet 77 retract, unseating poppet 77 from seat 78 in fluid passage means 90, and permitting hot water to again flow therethrough. Since the flow of hot water through fluid passage means 90 is increased, the ambient temperature will increase as desired.

As heaters 80 decrease in temperature, however, the temperature threshold level of thermistor 82 will be crossed, causing heaters 80 to be energized, thereby stablizing the ambient temperature. More particularly, as heaters 80 decrease in temperature, the resistance of thermistor 82 will quickly increase, thereby decreasing the current through resistor 58. Consequently, the voltage appearing across resistor 58 applied to negative terminal 62 of amplifier 60 will increase. When the comparison signal at positive terminal 60 exceeds the control signal at negative terminal 62, a positive effectuation signal will be produced at output terminal 63. This effectuation signal will be passed by diode 55, thereby causing triac 65 to conduct. As a result, A.C. current will flow through heaters 80, and the temperature thereof will increase, causing poppet 77 to again be seated in seat 78. Hot water flow through fluid passage means will thus be retarded, thereby stabilizing the ambient temperature at the desired value.

If cold water was flowing through fluid passage means 90 when an increase in temperature was called for by raising tap 28, a large, positive voltage would be passed to cold terminal 42 instead of hot terminal 41. As a result, an inverted voltage appears at output terminal 43, and ultimately, at negative terminal 62 of amplifier 60. Since the absolute value of the inverted voltage exceeds that of the comparison signal, a positive effectuation signal is produced at output terminal 63. In a manner described hereinabove, a positive effectuation signal at output terminal 63 energizes heaters 80, thereby causing poppet 77 to be seated in seat 78. This retards the flow of cold water through fluid passage means 90, thereby causing the ambient temperature to increase as desired. Of course, the ambient temperature will be stabilized at the desired level in the same manner described above.

It should be observed that if thermistor 82 becomes open-circuited, due to a broken lead, for example, current through resistor 58 tends to decrease, thereby decreasing the control signal at terminal 62 and ultimately energizing heaters 80. Heaters 80 would thus undesirably increase in temperature, thereby moving the piston to a position of fluid flow which does not correspond to the desired ambient temperature. In the circuit of the invention, however, thermistor 82 is coupled to base 22 of normally-conducting transistor 21. Thus, if thermistor 82 ever becomes open-circuited, base current through transistor 21 stops flowing, rendering transistor 21 non-conductive. When transistor 21 is non-conductive, D.C. voltage is not passed from emitter 23 to collector 24, thereby de-energizing amplifiers 40 and 60. As a result, no signal can be produced at output terminal 63 of amplifier 60, thereby de-energizing heaters 80.

It should be observed that the ambient temperature control system explained in the foregoing detailed description may be subject to many variations and changes without departing from the true spirit and scope of the invention. Accordingly, the invention should not be limited to the specific embodiment explained and described, but the ambient temperature control system defined in the appended claims.

I claim:

1. A structure for controlling ambient temperature comprising:
   a chamber containing thermal-expansive material;
   a piston, slidably secured within said chamber and movable outwardly therefrom upon expansion of said thermal-expansive material; said piston regulating fluid flow outside said chamber and said fluid flow controlling ambient temperature;
   heating means, secured outside said chamber, responsive to the production of an effectuation signal, and adapted to heat said thermal-expansive material; and
   temperature-sensitive resistance means, secured outside said chamber in thermal relationship with said heating means, having a temperature threshold level; said temperature-sensitive resistance means causing said heating means to respond to said effectuation signal when the temperature of said heating means crosses said temperature threshold level.

2. The structure set forth in claim 1 wherein said temperature-sensitive resistance means is embedded in thermal-conductive means disposed in close thermal relationship with said heating means.

3. The structure set forth in claim 2 wherein said thermal-conductive means is metal-oxide epoxy.

4. The structure set forth in claim 1 further including:
   fluid passage means, cooperable with said piston, and adapted to carry hot or cold water;
   fluid by-pass means adapted to carry hot water when said fluid passage means carries hot water, and cold water when said fluid passage means contain cold water;
   temperature responsive switching means, disposed in thermal-relationship with said fluid by-pass means, having a first mode and a second mode; said temperature-responsive switching means automatically switching to said first mode when hot water is carried in said fluid by-pass means, and said temperature-responsive switching means automatically switching to said second mode when cold water is carried by said fluid by-pass means;
   signal comparison means, coupled between said temperature-sensitive resistance means and said heating means, for producing said effectuation signal when said temperature-responsive switching means are in said first mode and the temperature of said heating means drops below said temperature threshold level of said temperature-sensitive resistance means; said comparison means also producing said effectuation signal when said temperature-responsive switching means are in said second mode and the temperature of said heating means drops below said temperature threshold level of said temperature-sensitive resistance means.

5. The structure set forth in claim 1 further including safety switch means coupled between said temperature-sensitive resistance means and said heating means for de-energizing said heating means when an open circuit appears in said temperature-sensitive resistance means.

6. A system for controlling ambient temperature comprising:
   a source of D.C. voltage for producing a comparison signal;
   ambient temperature selection means for producing a voltage corresponding to the temperature selected by said ambient temperature selection means;
   valve means, having heating means and temperature-sensitive resistance means disposed in thermal relationship with said heating means, for effecting a change in ambient temperature corresponding to the temperature of said heating means; said temperature-sensitive resistance means producing a control signal by varying said voltage produced by said ambient temperature selection means in accordance with the temperature of said heating means; and
   signal comparison means, coupled between said ambient temperature selection means and said heating means for receiving said control signal and said comparison signal; said signal comparison means producing an effectuation signal corresponding to the difference between said control signal and said comparison signal, causing said valve means to change the ambient temperature until it equals the temperature selected by said ambient temperature selection means.

7. The system set forth in claim 6 wherein said valve means further include:
   a chamber containing thermal-expansive material heatable by said heating means; and a piston, slidably secured within said chamber, and moving outwardly therefrom upon expansion of said thermal-expansive material.

8. The system set forth in claim 7 wherein said temperature-sensitive resistance means and said heating means are outside said chamber.

9. The system set forth in claim 7 further includes fluid passage means cooperating with said valve means, whereby said piston retards fluid flow within said fluid passage means upon expansion of said thermal-expansive material.

10. The system set forth in claim 9 wherein said fluid-passage means is adapted to carry hot water or cold water.

11. The system set forth in claim 6 wherein said signal comparison means include amplifier means having an inverting input terminal coupled to said temperature selection means for receiving said control signal, and a correlating input terminal coupled to said source of D.C. voltage for receiving said comparison signal; said amplifier further having an output terminal producing a correlating effectuation signal when said comparison signal exceeds said control signal, and an inverted effectuation signal when said control signal exceeds said comparison signal.

12. The system set forth in claim 11 further including uni-directional circuit means coupled to said output terminal of said amplifier means for blocking said inverted effectuation signal and passing said correlating effectuation signal.

13. The system set forth in claim 12 further including gating means coupled to said heating means, having a gating terminal coupled to said uni-directional circuit means; said gating means energizing said heating means upon receipt of said correlating effectuation signal.

14. The system set forth in claim 13 wherein said gating means is a triac.

15. The system set forth in claim 13 wherein said temperature-sensitive resistance means is a thermistor coupled to said inverting input terminal of said amplifier.

16. The system set forth in claim 15 further including safety switch means having a first terminal coupled to said thermistor, a second terminal coupled to said source of D.C. voltage, and a third terminal coupled to said signal comparison means for passing energizing voltage thereto, said signal comparison means requiring energizing voltage to produce said effectuation signal for said heater; said safety switch means blocking said energizing voltage from said third terminal to said signal comparison means, thereby de-energizing said heater when an open-circuit appears across said thermistor.

17. The system set forth in claim 16 wherein said safety switch means is a transistor.

18. A system for controlling ambient temperature comprising:
a source of D.C. voltage for producing comparison signal;
ambient temperature selection means for producing a voltage corresponding to the temperature selected by said ambient temperature selection means;
fluid by-pass means adapted to carry hot water or cold water;
temperature-responsive switching means, disposed in thermal-relationship with said fluid by-pass means, having a first mode and a second mode; said temperature-responsive switching means automatically switching to said first mode when hot water is carried by said fluid by-pass means, and said temperature responsive switching means automatically switching to said second mode when cold water is carried by said fluid by-pass means;
amplifier means having a correlating input terminal for receiving said voltage produced by said ambient temperature selection means when said temperature-responsive switching means is in said first mode and an inverting input terminal for receiving said voltage produced by said ambient temperature selection means when said temperature responsive switching means is in said second mode; said amplifier means further having an output terminal receiving an amplified correlating voltage when said temperature responsive switching means is in said first mode and an amplified inverted voltage when said temperature-responsive switching means is in said second mode;
valve means, having heating means and first temperature-sensitive resistance means disposed in thermal relationship with said heating means, for effecting a change in ambient temperature corresponding to the temperature of said heating means; said first temperature-sensitive resistance means producing a control signal by varying said voltage produced at said output terminal in accordance with the temperature of said heating means; and
signal comparison means, coupled between said output terminal and said heating means, for receiving said control signal and said comparison signal; said signal comparison means producing an effectuation signal corresponding to the difference between said control signal and said comparison signal, causing said valve means to change the ambient temperature until it equals the temperature selected by said ambient temperature selection means.

19. The system set forth in claim 18 wherein said valve means further include:
a chamber containing thermal-expansive material heatable by said heating means; and
a piston, slidably secured within said chamber, and moving outwardly therefrom upon expansion of said thermal-expansive material.

20. The system set forth in claim 19 wherein said first temperature-sensitive resistance means and said heating means are outside said chamber.

21. The system set forth in claim 19 further includes fluid-passage means, adapted to carry hot or cold water, cooperating with said valve means, whereby said piston retards fluid flow within said fluid passage means upon expansion of said thermal-expansive material.

* * * * *